United States Patent [19]

Tanimoto et al.

[11] Patent Number: 5,677,759
[45] Date of Patent: Oct. 14, 1997

[54] FILM TRANSFER AND VIEWING DEVICE

[75] Inventors: Tetsuyuki Tanimoto, Takatsuki; Shigeru Nagata, Sakai; Mutsuhiro Yamanaka, Yao; Atsuhiro Noda, Itami, all of Japan

[73] Assignee: Minolta Co., Ltd., Osaka, Japan

[21] Appl. No.: 388,840

[22] Filed: Feb. 15, 1995

[30] Foreign Application Priority Data

Feb. 17, 1994 [JP] Japan .................... 6-020106

[51] Int. Cl.$^6$ .................................... G03B 21/00
[52] U.S. Cl. ................. 355/75; 355/40; 353/26 R; 353/DIG. 2
[58] Field of Search .................. 355/40, 41, 75; 40/362, 364; 353/DIG. 2, 26 A, 26 R; 354/275; 358/302; 396/647

[56] References Cited

U.S. PATENT DOCUMENTS

| | | | |
|---|---|---|---|
| 3,748,023 | 7/1973 | Nelson | 40/343 |
| 4,073,581 | 2/1978 | Rayburn | 40/364 X |
| 4,491,434 | 1/1985 | Barr et al. | 40/362 |
| 4,825,243 | 4/1989 | Ito et al. | 355/41 |
| 5,258,859 | 11/1993 | Wada et al. | 358/487 |
| 5,521,662 | 5/1996 | Suzuki | 354/275 X |
| 5,618,093 | 4/1997 | Merle et al. | 353/26 R |

FOREIGN PATENT DOCUMENTS 4-336778 11/1992 Japan.

*Primary Examiner*—Joan H. Pendegrass
*Attorney, Agent, or Firm*—Burns, Doane, Swecker & Mathis, LLP

[57] ABSTRACT

The present invention is a film housing device comprising a film housing member that houses developed film; a driving mechanism that feeds the film housed in said housing member to a position outside the housing member where the film may be visually observed by the naked eye; and an operating member to operate said drive mechanism. Using said construction, when the operating member of the film housing device is operated, the drive mechanism operates and the developed film is fed to a position outside the housing member where the film may be visually observed by the naked eye. Therefore, the photographic content of the film may be confirmed with the naked eye using only the film housing device where it is not necessary to connect the device to a film reading device such as film scanner.

20 Claims, 11 Drawing Sheets

FILM TRANSFER AND VIEWING DEVICE

BACKGROUND OF THE INVENTION

1. Field of the Invention

The present invention relates to a film housing device used to observe or confirm images of a developed film, and more particularly, to a film housing device capable of allowing the user to thrust out the film and independently observe and confirm the images on the film without the use of a film image reading device, etc.

2. Description of the Prior Art

In the case of type 135 film, for example, generally the developed film is stored in a translucent resin film bag cases after being cut into a number of pieces with 6 frames comprising one unit. However, these cases are not sturdy, and moreover, unless the film is removed from the bag, developed images cannot be observed or confirmed.

In recent years, a cartridge capable of housing and storing the developed film has been proposed. By mounting this cartridge to the film image reading device, the images of the film inside said cartridge may be viewed.

In other words, the film image reading device constitutes an image input member of an image processing system comprising the reading device, a computer and a monitor. By operating the system, the images of the film stored in the dedicated cartridge are read by the reading device and processed by the computer and may then be observed or confirmed on the monitor.

In the case of the cartridge used as described above, due to its construction, the developed film cannot be thrust out for direct visual observation by the naked eye. Therefore, where the photographic content of developed film housed in more than one cartridge is to be checked, each of the cartridges must be mounted on the film image reading device and processed by the image processing system. However, such work can only take place in an area where the image processing system is installed, and it is problematic in terms of efficiency during the checking phase during which image processing is not necessary.

In view of the above, as a simpler method, indices recording the photographic content of the developed film housed in each cartridge may be placed at an appropriate area of the outer surface of the cartridge such that searching to confirm the photographic content may be easily performed. However, it is difficult to place numerous indices recording the information regarding all frames inside one cartridge, as well as to accurately know the photographic content merely from literal explanations.

As another method, if prints of all the images of the developed film housed in each cartridge are stored with the corresponding cartridge, the photographic content of the film may be confirmed by directly checking the printed images. However, with this method, the volume of storage would be enormous, leading to inconvenience in handling. In addition, additional recording means such as tables and writings in order to connect printed images and developed film would become necessary, which would pose number of practical problems.

Another conceivable method would be one in which a dedicated cartridge is connected to such device as a movie with or without being housed in an adapter and the content is then viewed. In this case, however, the adapter and the device to check the film images are both needed, which may compromise convenience in another sense, because space for the installment of these instruments would be needed and the images could be observed only in the area where they were installed.

SUMMARY OF THE INVENTION

The present invention was made in view of the above problems. Its object is to provide a film housing device capable of allowing the user to directly and easily independently confirm the photographic content of film housed in a cartridge with the naked eye without mounting the cartridge on a film image reading device and with the film still housed in the dedicated cartridge.

In order to achieve said object, the present invention discloses a film housing device comprising a housing member that houses developed film, a driving mechanism that feeds the film housed in said housing member to a position outside the housing member where the film may be visually observed by the naked eye, and an operating member to operate said driving mechanism.

Using said construction, when the operating member of the film housing device is operated, the driving mechanism operates and the developed film is fed to a position outside the housing member where the film may be visually observed by the naked eye.

Therefore, it is not necessary to connect the device with a film reading device such as a film scanner and the photographic content of the film may be confirmed with the naked eye using the film housing device alone.

BRIEF DESCRIPTION OF THE DRAWINGS

These and other objects and features of this invention will become clear from the following description, taken in conjunction with the preferred embodiments with reference to the accompanied drawings in which.

DETAILED DESCRIPTION OF THE INVENTION

Figure 1:
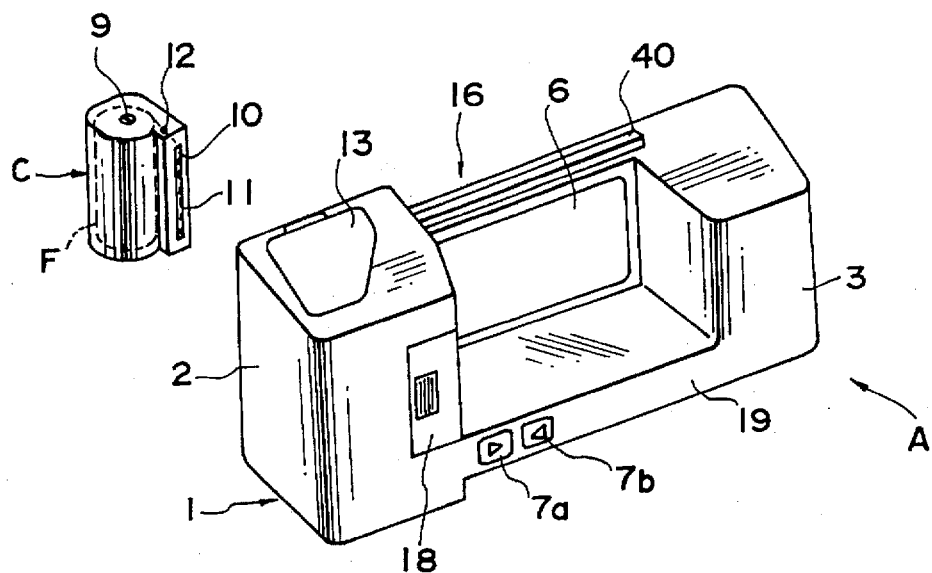
FIG. 1 is a perspective view of the appearance of a film check adapter in a first embodiment of the present invention.
Figure 2:
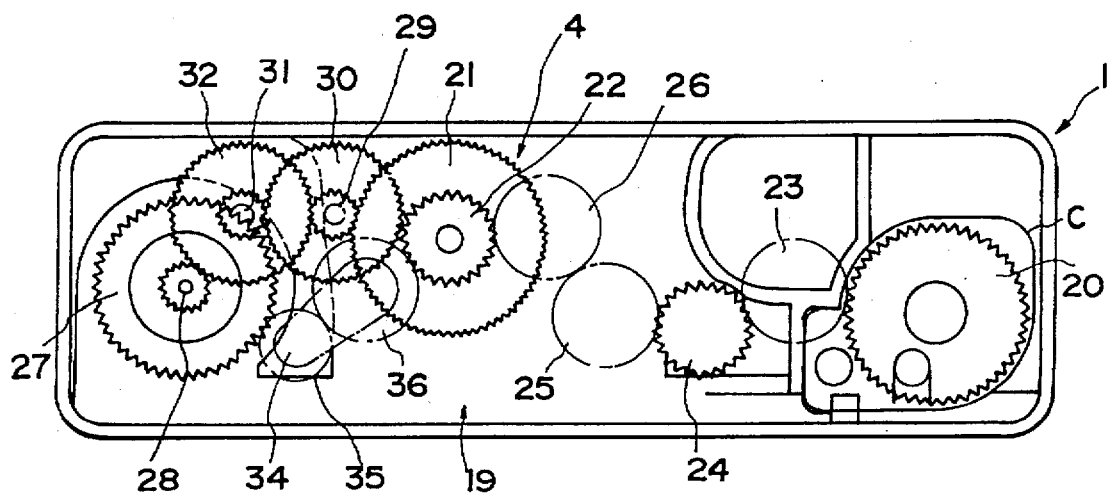
FIG. 2 is a transverse plan view of the feeding mechanism of the film check adapter seen from above.
Figure 3:
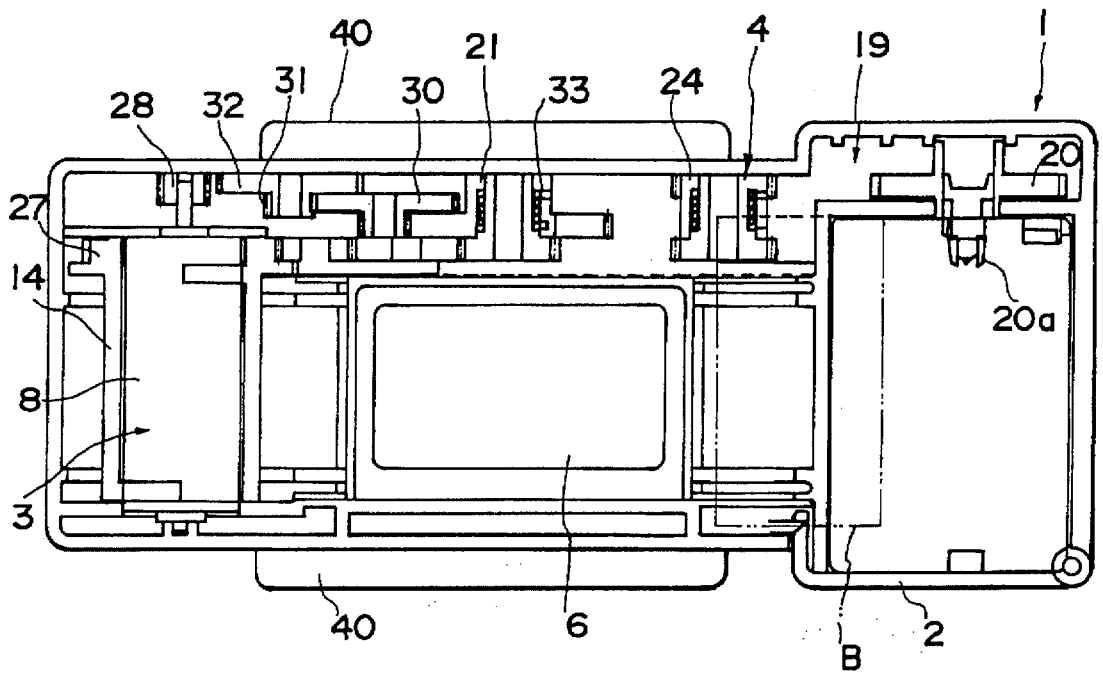
FIG. 3 is a vertical elevation of the construction of the inside of the film check adapter seen from behind.
Figure 4:
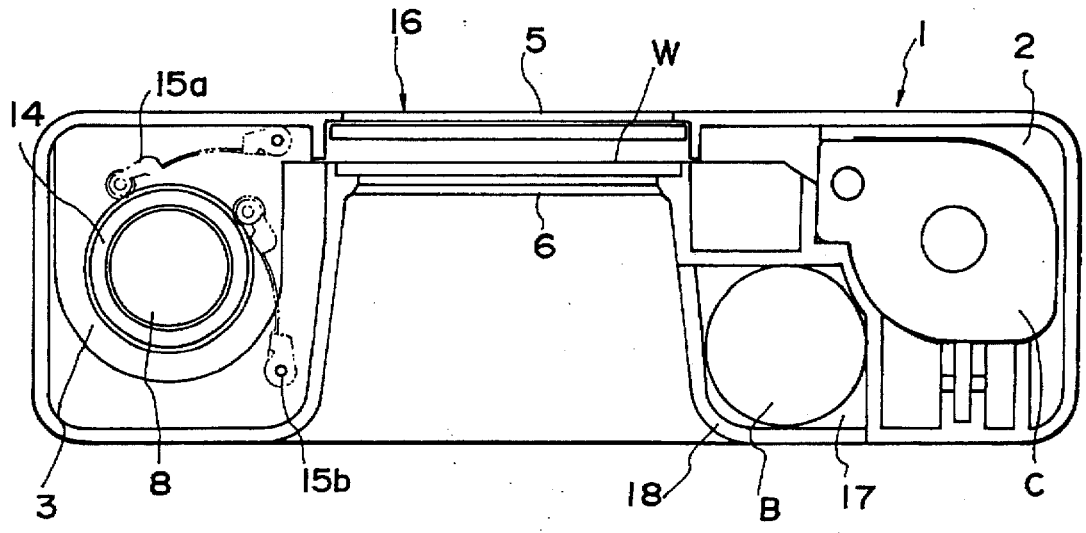
FIG. 4 is a transverse plan view of the construction of the inside of the film check adapter seen from below.

Embodiments of the present invention are described below with reference to the drawings. The same numbers are used for components involving the same construction or operation throughout the embodiments described below. FIGS. 1 through 4 show a film check adapter of a first embodiment of the present invention. FIG. 1 shows the appearance and FIGS. 2 through 4 show the interior construction, respectively.

The film check adapter A of this embodiment shown in these drawings comprises a feeding bay 2, in which a dedicated cartridge C is mounted, located on one end of a main unit case 1, a winding bay 3 located on another end to wind a film F housed in the cartridge C, a film feeding mechanism 4 between the feeding bay 2 and the winding bay 3, a observation window 5 located between the feeding bay 2 and the winding bay 3 to observe the film F which is forwarded frame by frame by the film feeding mechanism 4 from the feeding bay 2 to the winding bay 3, and a lighting window 6 opposite the observation window 5 across a film path W.

By operating one of frame feeding buttons 7a and 7b, located at appropriate positions on the outer side of the main unit case 1, a motor 8 comprising a stepping motor, etc., operates, whereby the film feeding mechanism 4 connected to the motor 8 operates to feed the film F frame by frame from the feeding bay 2 to the winding bay 3, or vice versa.

Figure 5:
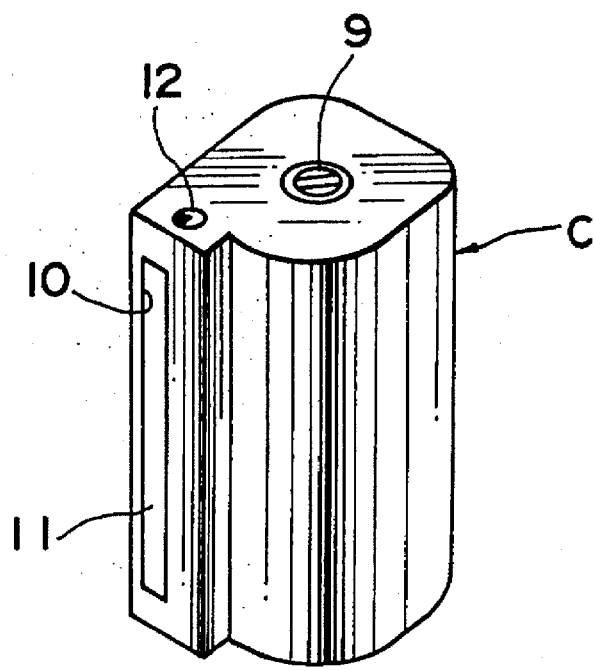
FIG. 5 is a perspective view of the appearance of an example of a film housing cartridge.
Figure 6:
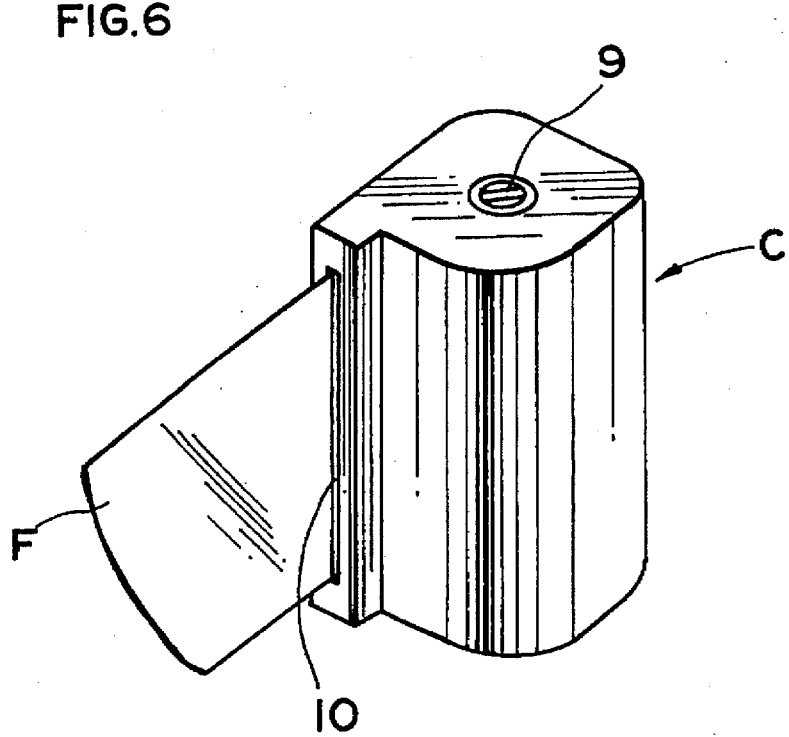
FIG. 6 is a perspective view of the appearance of another example of a film housing cartridge.

The dedicated cartridge C may comprise, as shown in FIG. 5, for example, a film winding axle 9 located at the center of the cartridge, over which the long film F is rolled, a outlet 10 to thrust out the film F located at one end of the cartridge, and a cover 11 that can be opened and closed located over the outlet 10, wherein when the film F inside the cartridge is thrust out, the cover 11 opens by operating a cover opening/closing engagement hole 12 on the top surface of the cartridge.

The cartridge C may also have a construction in which the film F is mounted in the cartridge with a prescribed length of an end portion of the film F thrust out of the cartridge outlet 10 beforehand such that opening and closing of the cover is not needed when the cartridge is used. In either of the cartridge C constructions, the developed film is used.

Because the developed film is used, in the case of the first cartridge C construction shown in FIG. 5 the cover can be omitted.

The feeding bay 2 has a cover 13, which opens and closes, at a top opening. In the case of an adapter in which the cartridge C with a cover 11 shown in FIG. 5 is used, although not shown in the drawings, there is a cartridge cover open/close mechanism which forcibly opens the cover 11 of the cartridge C by operating in response to the closing of the cover 13. In this case, when the cartridge cover open/close mechanism operates in reverse fashion in response to the opening of the cover 13, the cover 11 of cartridge C automatically closes.

As shown in FIG. 4, an end of the feeding bay 2 facing the winding bay 3 leads to the film path W that passes the observation window 5. The cartridge C is mounted in the feeding bay 2 such that the outlet 10 faces the end leading to the path W. An end of the winding bay 3 facing the feeding bay 2 also leads to the path W.

The winding bay 3 has a winding spool 14 rotatably located in its center. A pair of spring-powered film clamps 15a and 15b are in contact with the outer surface of the winding spool 14. The film F is conveyed inward towards the center of the winding spool 14 by the film clamps 15a and 15b when the winding spool 14 rotates to wind the film F such that it is wound while being pressed down onto the outer surface of the winding spool 14.

The observation window 5 and the lighting window 6 are formed on a bridge 16 of the main unit case 1 located in the front part and between the feeding bay 2 and the winding bay 3, and both are covered by a glass or a transparent plastic plate. 17 is a battery bay located in the main unit case 1 next to the feeding bay 2, where a battery B, a power source for the motor 8, is mounted. 18 is an openable cover to the battery bay 17.

The film feeding mechanism 4 comprises a line of gears aligned from the feeding bay 2 toward the winding bay 3 and is housed in a mechanism housing 19 formed between the lower parts of the feeding bay 2 and the winding bay 3.

As shown in FIGS. 2 and 3, the line of gears comprising the film feeding mechanism 4 comprises a feeding gear 20 having a feeding axle 20a which engages with an end of the axle of the film winding spool 9 of the cartridge C and facing the feeding bay 2, coaxial large and small interlocking gears 21 and 22, middle gears 23 through 26 located between the small interlocking gear 22 and the feeding gear 20, a spool gear 27 formed as one unit with the winding spool 14 of the winding bay 3, a driver gear 28 located on the same axle as a spool gear 27, which transmits the drive power of the motor 8, and reduction gears 29 through 32 located between the driver gear 28 and the interlocking gears 21 and 22.

A spring clutch 33 is sandwiched between the large and small interlocking gears 21 and 22. Since a load is added to the large gear 21 when the film F winds around the spool gear 27, the large gear 21 and the small gear 22 rotate together due to the action of the spring clutch 33. 34 is an arm which axially supports a switching gear 35 which engages with the spool gear 27 on one end and a transmission gear 36 which engages at all times with the small interlocking gear 22 on the other end.

The frame by frame feeding of the film F in the film check adapter A of this construction is explained below. First, the cover 13 of the film check adapter A is opened and the cartridge C is mounted in the feeding bay 2. Then, when cover 13 is closed, the feeding axle 20a of the film feeding mechanism 4 engages with the film winding spool 9 of the cartridge C, whereupon the frame-by-frame film feeding may be started.

Figure 7A:
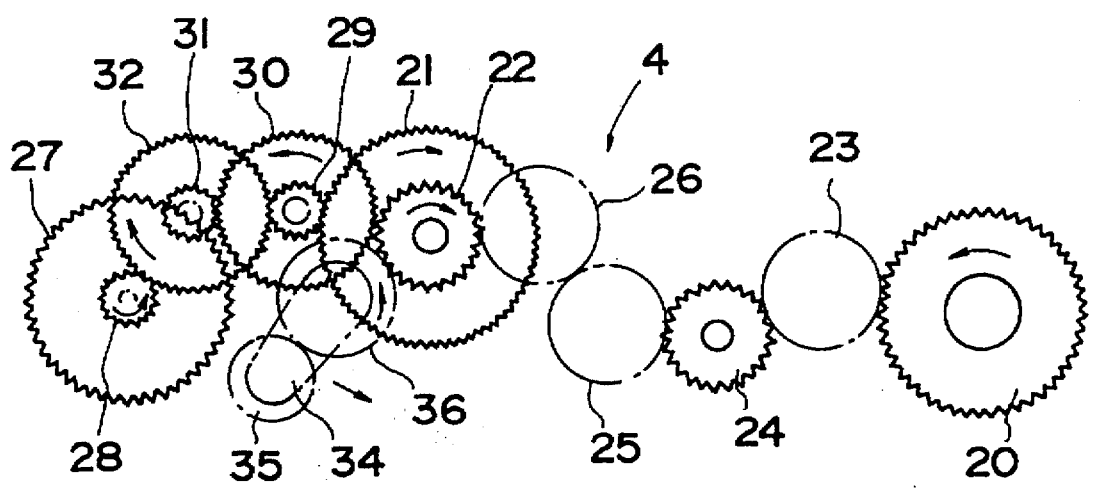
FIG. 7(A) is a plan view of key areas of the feeding mechanism seen from above showing its operations during film rewinding.
Figure 7B:
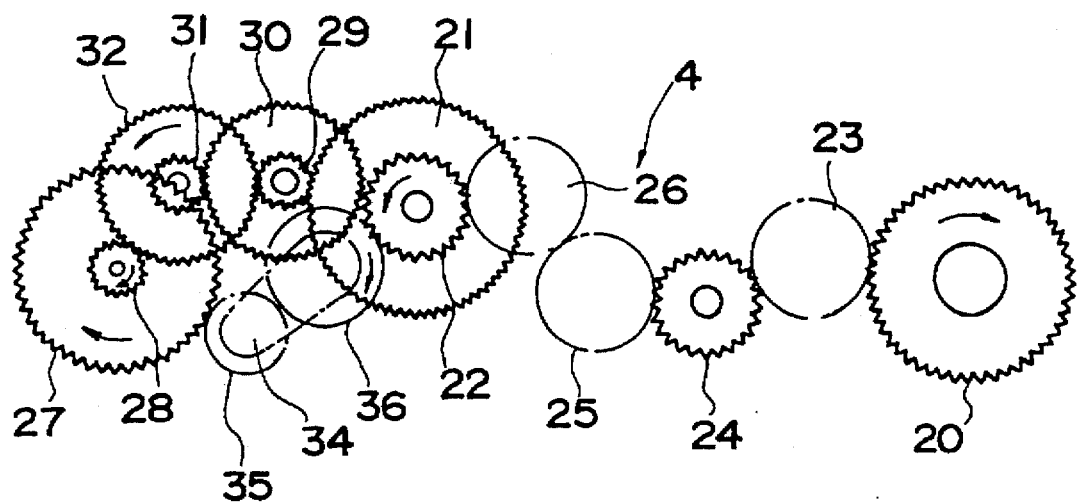
FIG. 7(B) is a plan view of key areas of the feeding mechanism seen from above showing its operations during film forwarding.

FIGS. 7(A) and 7(B) show the operations of the film feeding mechanism 4. FIG. 7(A) shows the operation when the film is rewound into the cartridge C. FIG. 7(B) shows the operation when the film is fed outside the cartridge C. After the cartridge C is mounted, when the frame feeding button 7a to advance the film is pressed, the motor 8 rotates in the direction to feed out the film. The rotation of the motor 8 is transmitted from the driver gear 28 to the feeding gear 20 through the reduction gears 29 through 32, the large and small interlocking gears 21 and 22 and the middle gears 23 through 26. This causes the spool 9 of the cartridge C to rotate, whereby the film F is thrust out from the cartridge C and fed toward the winding bay 3 through the film path W.

After the film F winds around the winding spool 14, as described above, it is wound efficiently by virtue of the pressing action by the film clamps 15a and 15b. In addition, at the same time as the film F winds around the winding spool 14, the film's load is added to the large interlocking gear 21, whereby the small interlocking gear 22 starts rotating together with the large gear 21 and the transmission gear 36 engaged with the small gear 22 rotates. As shown in FIG. 7(B), this causes the arm 34 to rotate counterclockwise and the switching gear 35 engages with the spool gear 27. As a result, the spool gear 27 rotates, causing the film F to wind around the spool 14.

The frame-by-frame film feeding of the film F is performed while the images of the film F are viewed through the observation window 5. During this viewing, light is taken in from the lighting window 6 opposite the observation window 5 in order to make the viewing of images easy. In this case, the frame-by-frame film feeding of the film F is performed based on the visual viewing by the naked eye.

Incidentally, although not shown in the drawings, other than the visual frame-by-frame film feeding by the naked eye, the construction may be such that perforations are detected by a photo sensor or a frame number is externally displayed through the detection of the film base between frames. In this case, the external display may be a counter display using a counter, LED, LCD, etc. In addition, imprinting of the frame numbers on the film itself in the form of magnetic or optical information has been proposed in recent years. It is also acceptable if the adapter is equipped with a means such as a magnetic head or a photo sensor to read such information and the display is performed using this means.

When the film F is rewound, the frame feeding button 7b for rewinding is pressed, causing the motor 8 to rotate in the rewinding direction, which is reverse of that for forwarding. In this case, as in the case of the film forwarding, the rotation of the motor 8 causes the feeding gear 20 to rotate in reverse via the line of gears of the film feeding mechanism 4, as a result of which the film F is rewound. At this time, the arm 34 rotates clockwise by means of the rotation of the small interlocking gear 22 in the direction reverse of the film forwarding direction, releasing the engagement between the switching gear 35 and the spool gear 27 (see FIG. 7(A)). As a result, the spool gear 27 rotates freely.

As described above, using this embodiment, because an automatic feeding mechanism using the motor 8 is employed as the film feeding mechanism 4, the frame-by-frame film feeding operation can be performed easily with great convenience.

While the above embodiment was shown with the construction in which the feeding mechanism 4 for the forwarding and rewinding of the film F comprises a line of gears as one example, other types of constructions, such as one using worm gears or a belt driven mechanism may also be used. The drive mechanism may also have separate motors for feeding and rewinding instead of a single motor. Further, as a drive power source, an AC adapter or an AC adapter and a battery may be used instead of a battery.

Figure 8:
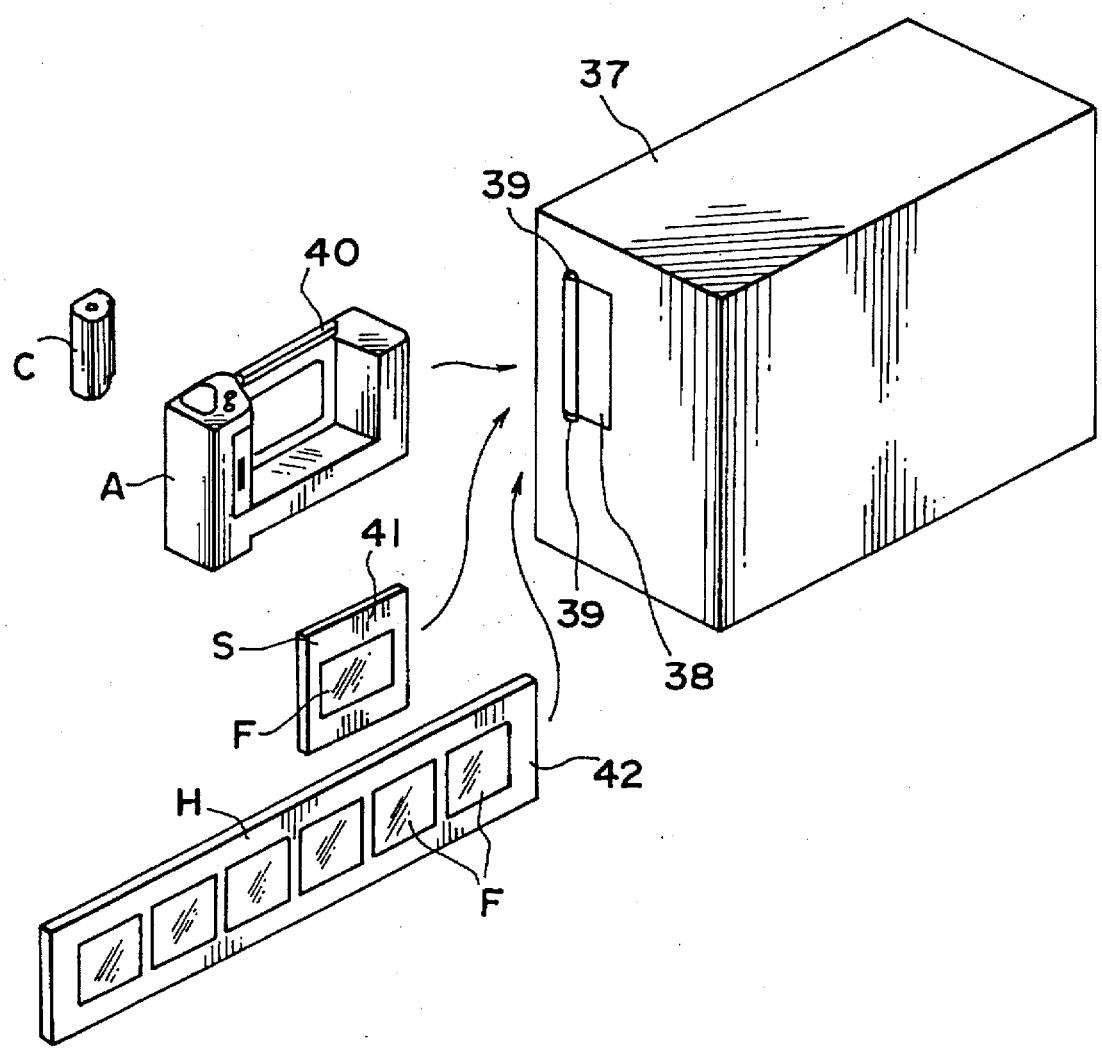
FIG. 8 is a perspective view of the appearance of one example of a film scanner in which the film check adapter of this embodiment can be mounted.
Figure 9:
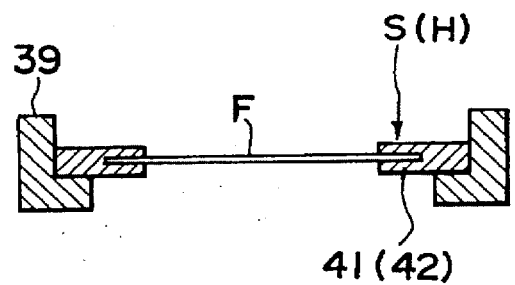
FIG. 9 is a cross-sectional view of key areas showing a slide mount mounted on the film scanner.
Figure 10:
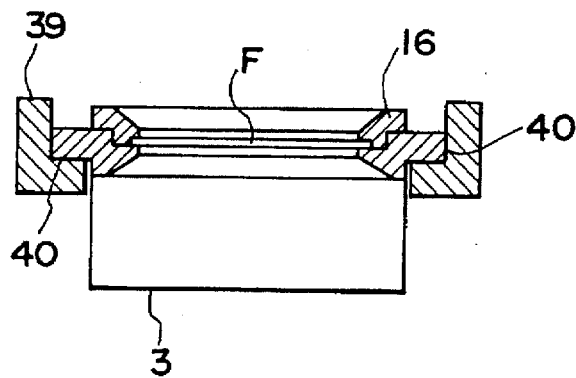
FIG. 10 is a cross-sectional view of key areas showing the film check adapter of this embodiment mounted on the film scanner.

FIGS. 8 through 10 show one example of a film scanner in which the adapter of this embodiment may be mounted. This film scanner 37 is a device that reads the images on the film F housed in the cartridge C, wherein single film mounting inlet 38 is located on one side of the main unit such that in addition to film check adapter A housing the cartridge C, a slide mount S and a film holder H may also be mounted via the film mounting inlet 38.

In other words, the film mounting inlet 38 is formed in a configuration and dimensions which allow the film check adapter A to be inserted from the side and has guides 39 at the upper and lower ends on one side. On the other hand, guide protrusions 40 which can be engaged with guides 39 are located on upper and lower surface of the bridge 16 of the film check adapter A.

The slide mount S comprises a frame 41 which holds one frame of the film F while the film holder H comprises single long frame 42 which, with regard to type 135 film, for example, holds a film piece having six consecutive frames. The length between the upper and lower guide protrusions 40 of the film check adapter A is designed to be the same as the vertical length of the slide mount S and the film holder H.

Therefore, when the slide mount S or the film holder H is mounted through the film mounting inlet 38 of the film scanner 37, as shown in FIG. 9, the upper and lower surfaces of the guides 39 come in contact with the frame 41 or 42 and hold the upper edge of the frame 41 or 42 of the slide mount S or the film holder H. Similarly, when the film check adapter A is mounted in the film mounting inlet 38, as shown in FIG. 10, the entire adapter is housed in the film mounting inlet 38 with the guide protrusions 40 engaging with the guides 39.

As described above, since the film check adapter A, the slide mount S and the film holder H, each of which is mounted in the film mounting inlet 38, have the same length, the structure of the film scanner 37 is simplified. That is, images can be read without moving the scanning system (not shown in the drawings) of the film scanner 37, and the number of components may be reduced.

Figure 11:
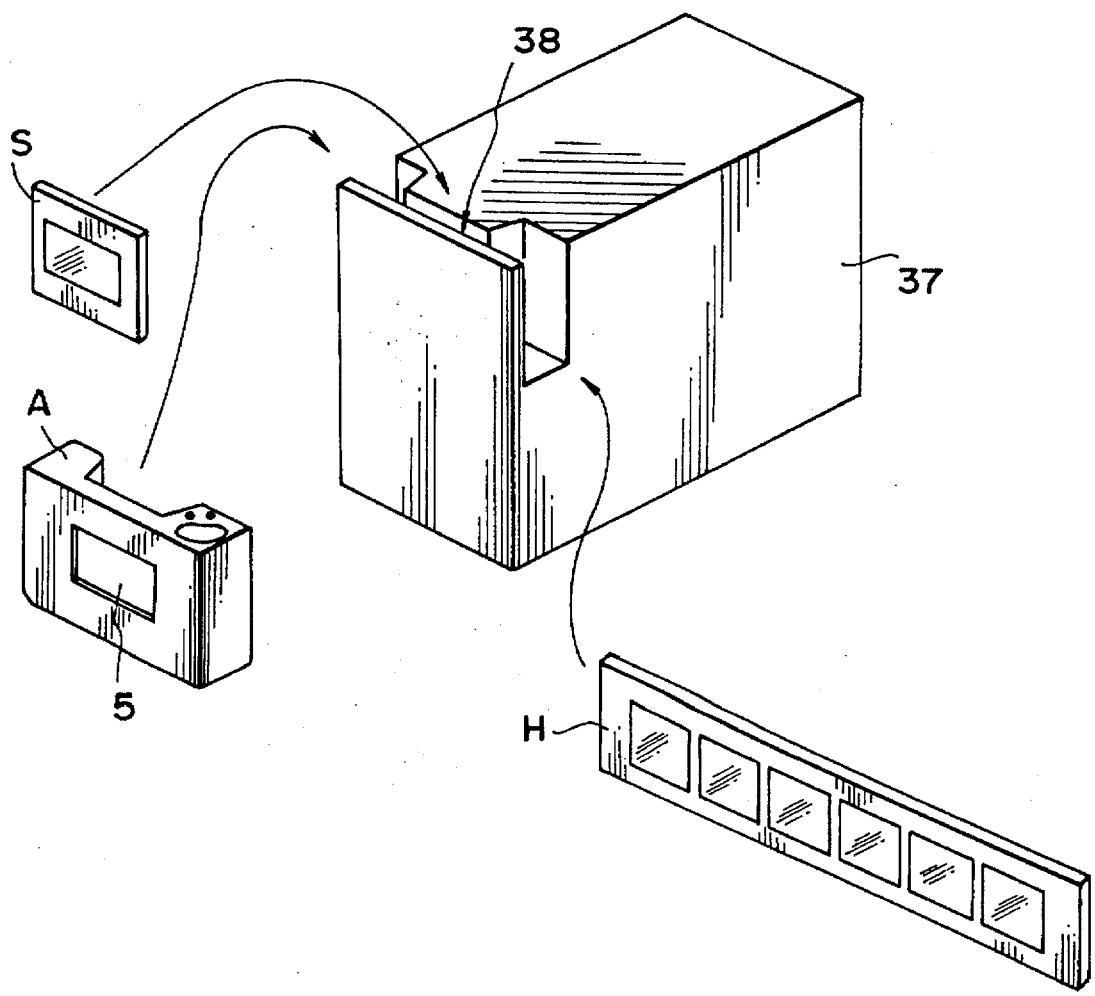
FIG. 11 is a perspective view of the appearance of another example of a film scanner on which the film check adapter of this embodiment can be mounted.

Incidentally, the location of the mounting inlet 38 of the film scanner 37 is not limited to the side of the main unit as shown in FIG. 8; it may also be located on the top as shown in FIG. 11, for example. In this case, the mounting inlet 38 should have a configuration that fits the plan configuration of the film check adapter A which can also accommodate the slide mount S and the film holder H. Needless to say, the direction and method for the mounting regarding the film scanner 37 may vary depending on various other designs.

Figure 12:
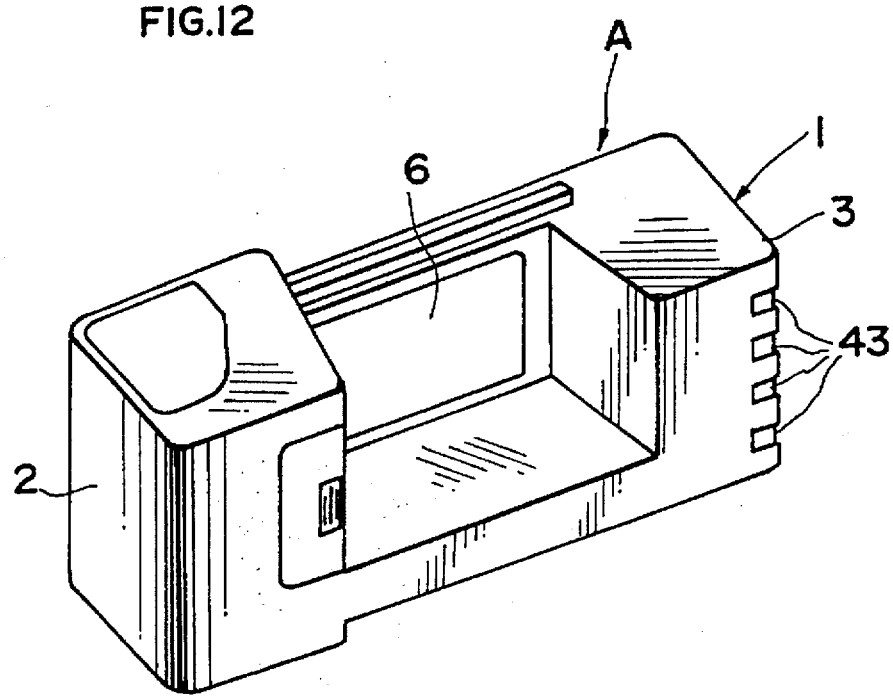
FIG. 12 is a perspective view of the appearance of the film check adapter of this embodiment which has electric connecting pieces located on its outside.

FIG. 12 shows the adapter of this embodiment on the outer side of which electric connecting pieces are located. As shown in this drawing, when the film check adapter A is used mounted in the film scanner 37, the electric connecting pieces 43 are located on the outer surface of the main unit case 1 such that the film check adapter A may be controlled in various ways by an outside control device such as the film scanner 37 or a personal computer (not shown in the drawings) connected to the film scanner. More specifically, said connecting pieces 43 may be located in a corner, etc. of main unit case 1 and are electrically connected to motor 8 inside said main unit case 1.

When the film check adapter A may be controlled by the outside device such as film scanner 37, where the magnetic information or optical information is recorded on the side of film check adapter A, for example, a construction may be used in which such information may be communicated to the outside device such as film scanner 37 or the personal computer, etc. when needed by having a microcomputer in the film check adapter A as well.

Figure 13:
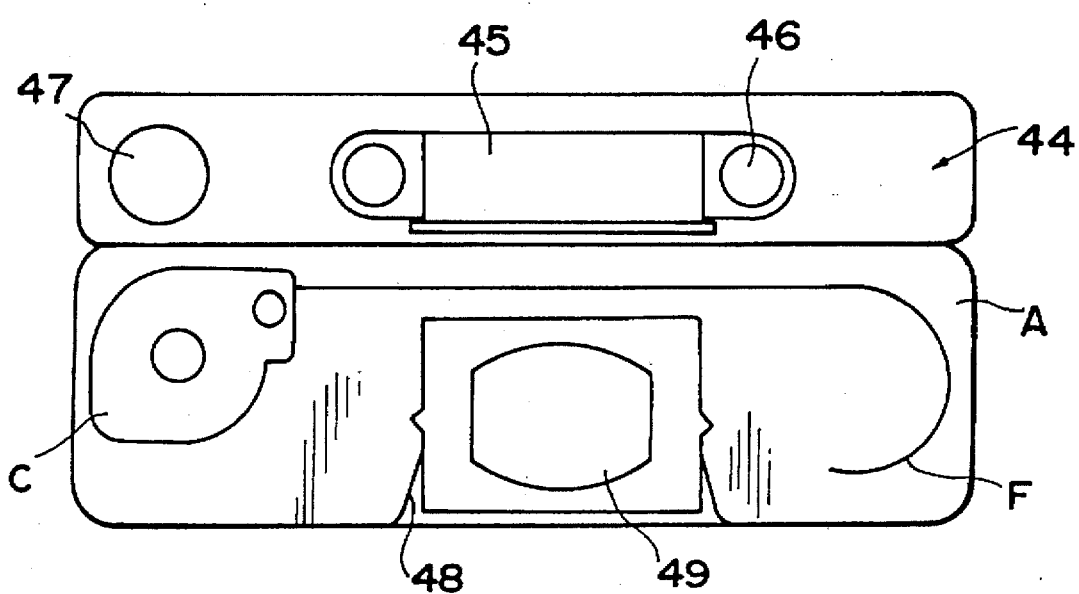
FIG. 13 is a transverse plan view showing the film check adapter of this embodiment to which a magnifying lens and lighting unit are mounted.

FIG. 13 shows the adapter of this embodiment onto which a lighting unit and an magnifying lens are mounted. As shown in this drawing, where outside light of a luminous intensity needed for the observation, etc. of film F is not obtained, such as in a dimly lit room or at night, for example, a lighting unit 44 may be mounted on the film check adapter A so that the film images may be easily recognized by the eye.

The lighting unit 44 shown in FIG. 13 can be mounted on the front of the film check adapter A and comprises a transmission window 45 which is located at a position facing the observation window 5 when the lighting unit 44 is thus mounted, a illuminating light 46 as a light source, located around the transmission window 45, wherein a battery 47 as a power source of the illuminating light 46, may be housed around the transmission window 45 and wherein the lighting unit 44 illuminates the film F facing the observation window 5 from the front such that it may be observed through the lighting window 6.

In this embodiment, the film images are observed from the reverse side of that in the embodiment shown in FIG. 4. However, that is not problem because the film images are only confirmed.

Images of type 135 film are small as they are and often are difficult to see with the naked eye. In such a case, if a magnifying lens 49 having a configuration and size such that it may be inserted into center concave area 48 of the main unit case 1 is mounted, the ability to perform film image observation can be greatly improved. Incidentally, while the example shown in the drawing shows the construction in which the lighting unit 44 and the magnifying lens 49 are separate, they may be constructed as one unit as well.

Figure 14:
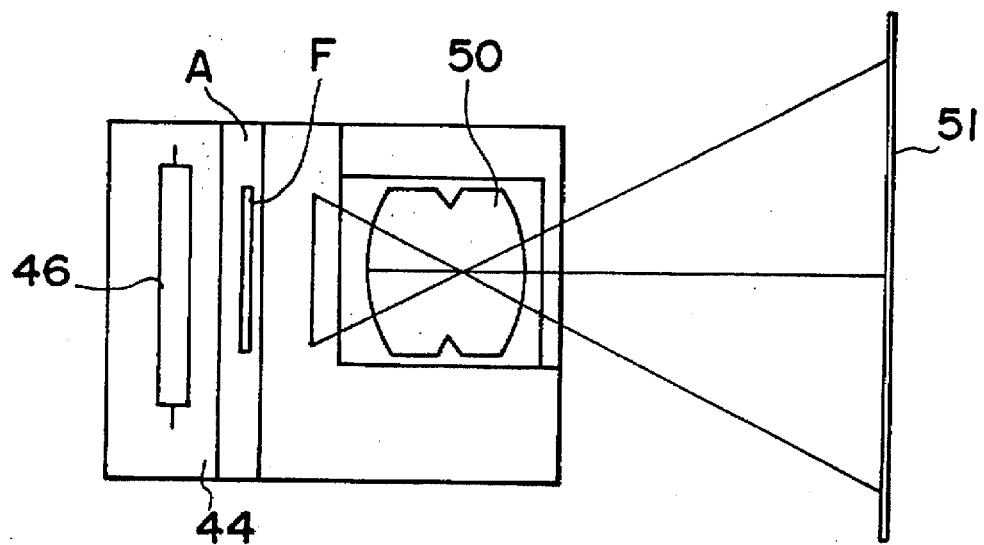
FIG. 14 is a vertical side view showing the film check adapter of this embodiment used in combination with a project lens and a screen to project film images.

FIG. 14 shows the adapter of this embodiment in use with a projection lens and a screen. As shown in this drawing, if a projection lens 50 is used in place of the magnifying lens 49 such that the film image facing the observation window 5 of the film check adapter A is projected on a screen 51 in enlargement, the adapter may be used as a projector as well.

While the first embodiment shows an example of the film check adapter capable of automatic film feeding in which the motor 8 is used as the drive source of the film feeding mechanism 4, the present invention may be applied to manual film check adapters as shown in the following embodiments.

Figure 15:
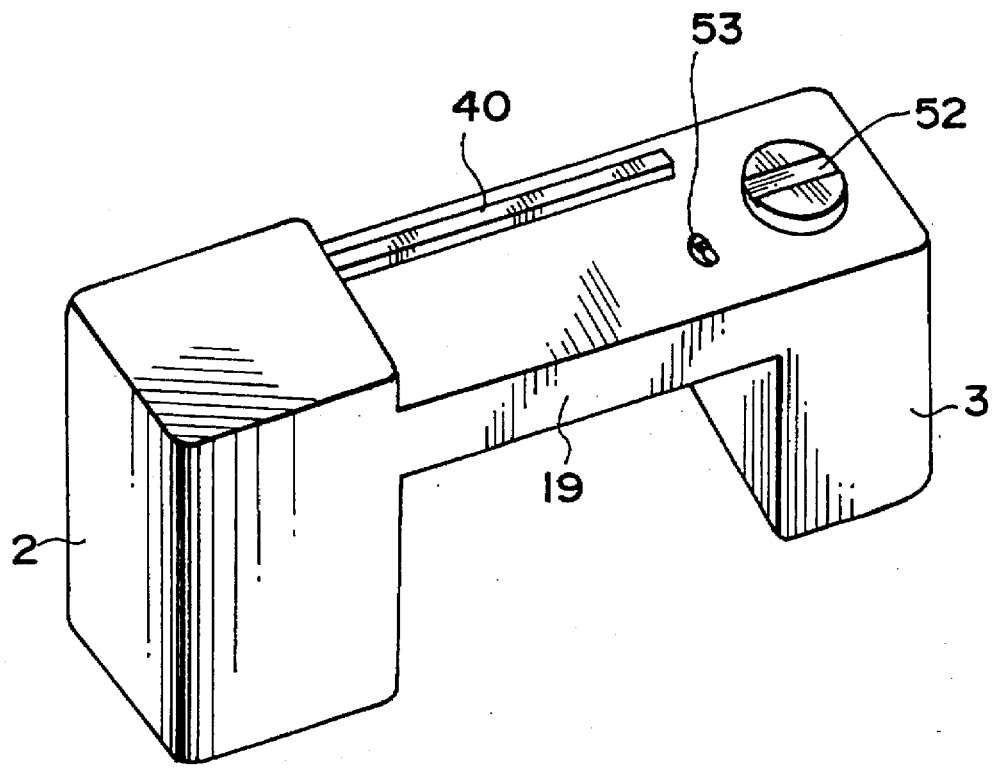
FIG. 15 is a perspective view of the appearance of a film check adapter in a second embodiment of the present invention.

FIG. 15 shows a film check adapter of a second embodiment of the present invention. Using the film check adapter A of this embodiment shown in this drawing, frame-by-frame film feeding of the film F is performed manually. In other words, in this embodiment as shown in FIG. 15, motors are not used for the mechanism to operate the film feeding mechanism 4 housed in the main unit case 1, but rather rotatable crank 52 is used, which operates the film feeding mechanism 4 of the same construction as the feeding mechanism for the first embodiment.

Figure 16:
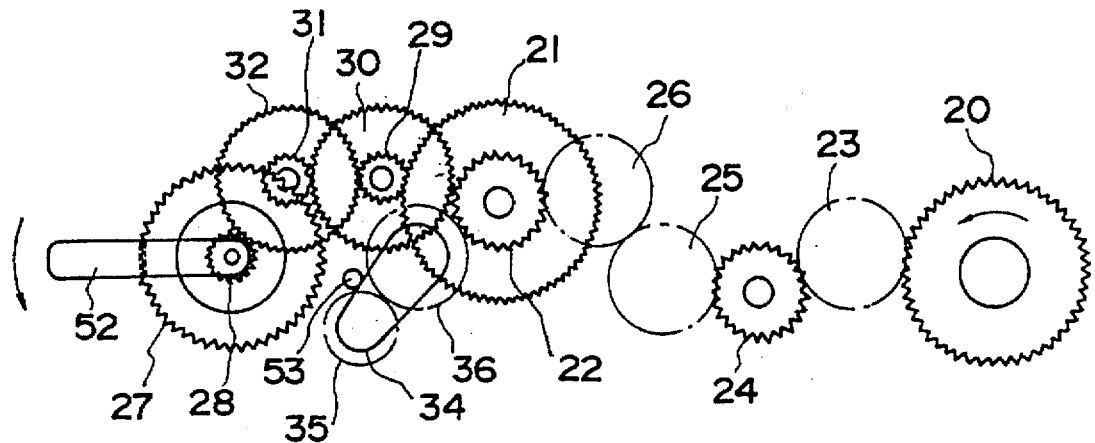
FIG. 16(A) is a plan view of key areas of the feeding mechanism seen from above showing its operations during film rewinding.
FIG. 16(B) is a plan view of key areas of the feeding mechanism seen from above showing its operations during film forwarding.
Figure 16B:
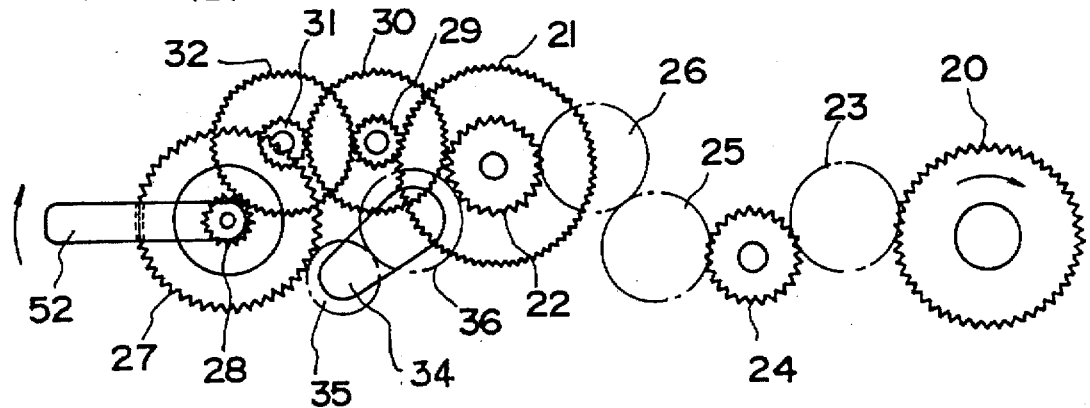

FIGS. 16(A) and 16(B) show the feeding mechanism 4. FIG. 16(A) shows the operation during film rewinding. FIG. 16(B) shows the operation during film forwarding. The rotatable crank 52 is located on the same axle as the driver gear 28 which engages with the gear 32 positioned at the input end of reduction gears. By turning the crank 52 to the direction to forward the film (clockwise), the film F is forwarded on a frame-by-frame basis. 53 is a rewinding button. The operation of the film feeding mechanism 4 in this case takes place in the same manner as that for the first embodiment.

In other words, the rotation of the rotatable crank 52 is transmitted to the feeding gear 20 from the driver gear 28 via the line of gears, whereby the film F is fed out of the cartridge C. The load that occurs when the film F winds around the winding spool 14 causes the interlocking gears 21 and 22 to rotate together, which causes the transmission gear 36 to rotate. Then, as shown in FIG. 16(B), the arm 34 rotates counterclockwise and the switching gear 35 engages with the spool gear 27. As a result, the spool gear 27 rotates and the film F is wound around the spool 14.

Rewinding is performed by causing the arm 34 to rotate and release the engagement with the spool gear 27 while pressing the rewinding button 53, and then turning the rotatable crank 52 in the direction to rewind the film (counterclockwise) (see FIG. 16(A)). As described above, in this embodiment, because film feeding is performed manually using the rotatable crank 52 as the mechanism to operate the film feeding mechanism 4, the manufacturing cost may be reduced.

Figure 17:
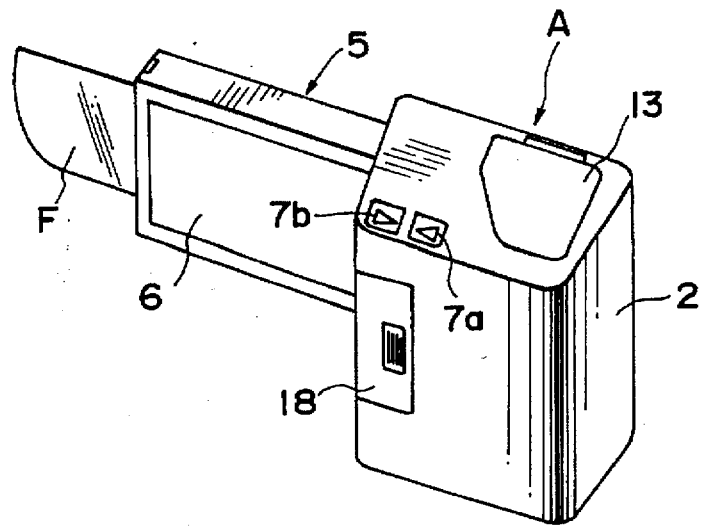
FIG. 17 is a perspective view of the appearance of a film check adapter in a third embodiment of the present invention.
Figure 18:
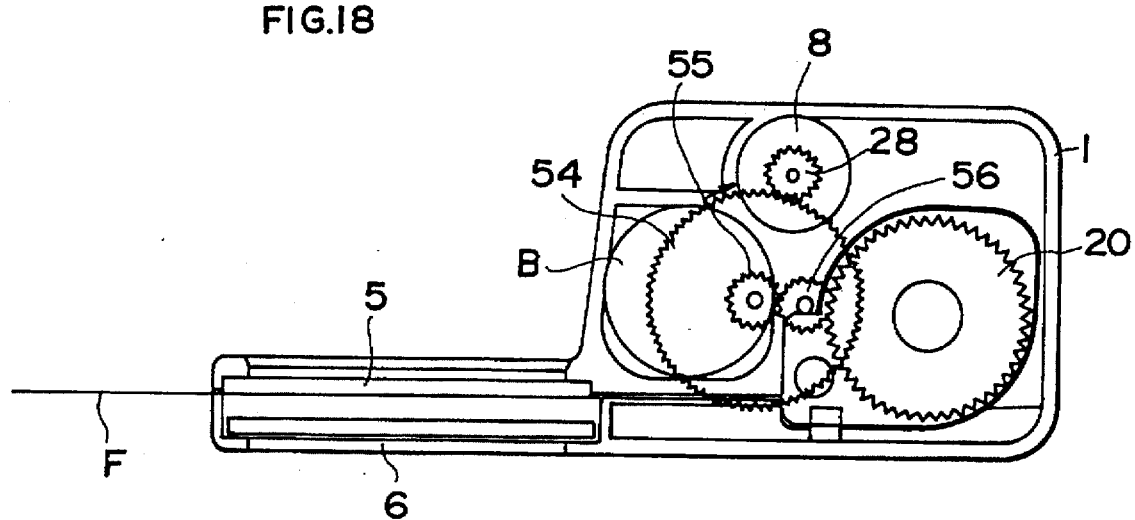
FIG. 18 is a transverse plan view showing the construction of the inside of the film check adapter seen from above.

FIGS. 17 and 18 show a film check adapter of a third embodiment of the present invention. In this embodiment, the winding bay in the previous embodiments is omitted and automatic frame-by-frame film feeding takes place based on the drive power of the motor 8. In other words, as shown in FIG. 18, the film feeding mechanism 4 is located on the side of the feeding bay 2 in which the dedicated cartridge C is mounted, and one end of the film path W which passes the observation window 5 and the lighting window 6 is open.

The feeding mechanism 4 located on the side of the feeding bay 2 is constructed such that the drive power of the motor 8 is transmitted to the feeding gear 20 via driver gear 28 located at the end of the axle of motor 8 and reduction gears 54 through 56 that engage with the driver gear 28. Film forwarding and rewinding can be performed by operating the frame feeding buttons 7a and 7b.

Figure 19:
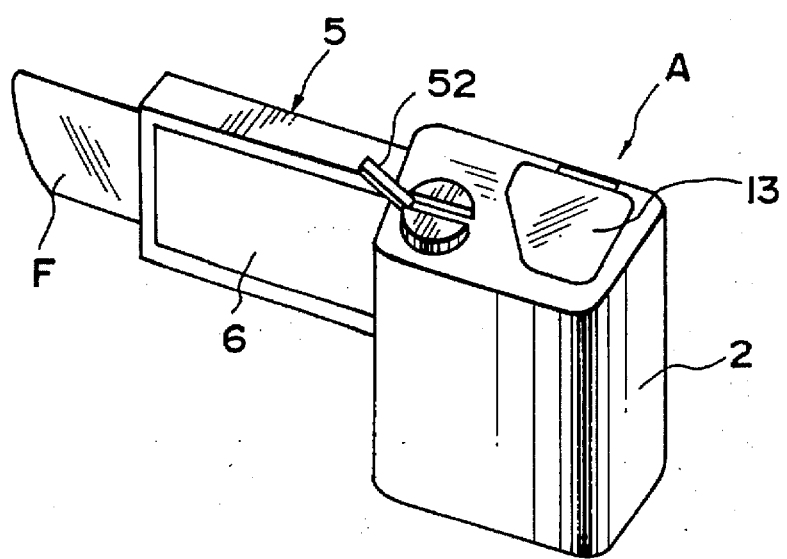
FIG. 19 is a perspective view of the appearance of a film check adapter in a fourth embodiment of the present invention.
Figure 20:
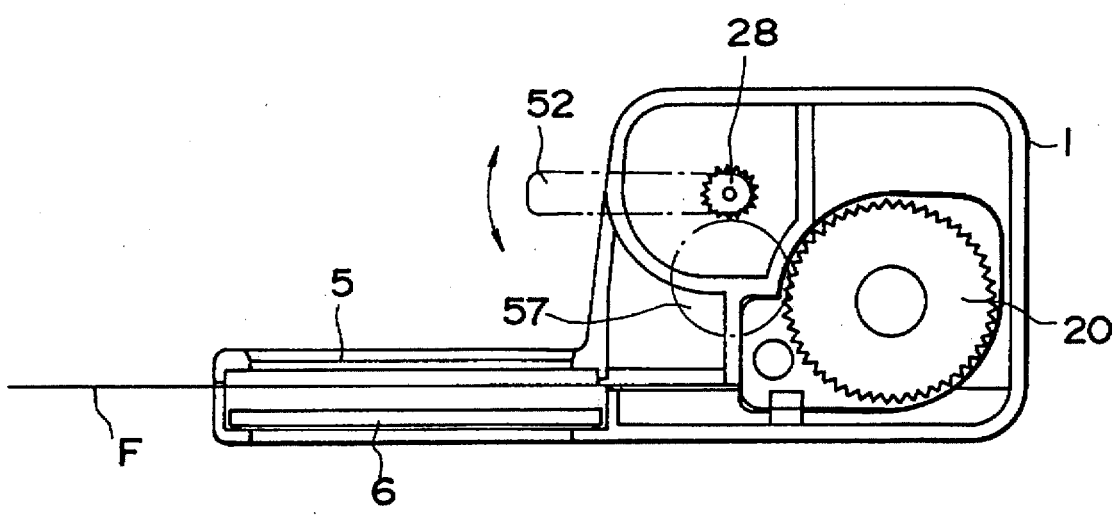
FIG. 20 is a transverse plan view showing the construction of the inside of the film check adapter.

FIGS. 19 and 20 show a film check adapter of a fourth embodiment of the present invention. In this embodiment, in place of the automatic frame-by-frame film feeding mechanism via the drive power of motor 8 in the construction of the third embodiment, the rotatable crank 52 is located on the side of the feeding bay 2 such that frame-by-frame film feeding may be performed manually.

In other words, as shown in FIG. 20, the forwarding and rewinding of the film F are performed by turning the rotatable crank 52. In this case, regarding the film feeding mechanism 4, the rotation of the rotatable crank 52 is transmitted to the feeding gear 20 via the driver gear 28 located on the rotational axle of the rotatable crank 52 and the middle gear 57 which engages with the driver gear 28.

In the third and fourth embodiments of the present invention, because the rewinding bay 3 does not exist, the film F remains outside the adapter, so that the embodiments suit short rolls of film. Since this construction is simpler, it offers the advantage of being obtained at a lower cost.

As described above, using the constructions of each of the embodiments, the present invention can be more effectively utilized when combined with a separate device such as a film reading device.

Obviously, many modifications and variation of the present invention are possible in light of the above teachings. It is therefore to be understood that within the scope of the appended claims, the invention may be practiced other than as specifically described.

What is claimed is:

1. A film transfer device comprising:
   a housing member that houses a film container in which developed film is entirely accommodated;
   a driving mechanism that thrusts the film and transfers the film to a position outside the housing member; and
   an operating member to operate said driving mechanism.

2. A film transfer device claimed in claim 1, further comprising a drive source housing member, wherein the film is fed by the power from a drive source.

3. A film transfer device claimed in claim 2, wherein said driving mechanism comprises a film feeding mechanism which feeds the film by the driving power from said drive source.

4. A film transfer device claimed in claim 1, wherein said operating member is manually operated.

5. A film transfer device claimed in claim 2, wherein said operating member is manually operated.

6. A film transfer device claimed in claim 1, wherein said film housing device is mounted on a reproducing device that reproduces the film images.

7. A film transfer device claimed in claim 2, wherein said film housing device is mounted on a reproducing device that reproduces the film images.

8. A film transfer device comprising:
   a housing member that houses a film container in which developed film is entirely accommodated;
   a driving mechanism that thrusts the film out of said film container;
   an operating member to operate said driving mechanism;
   an opening to visually observe the film images using ambient light; and
   a film winding member that winds the film fed from said film housing member via said opening.

9. A film transfer device claimed in claim 8, further comprising a drive source housing member, wherein the film is fed by the power from a drive source.

10. A film transfer device claimed in claim 9, wherein said driving mechanism comprises a film feeding mechanism which feeds the film by the driving power from said drive source.

11. A film transfer device claimed in claim 8, wherein said operating member is manually operated.

12. A film transfer device claimed in claim 9, wherein said operating member is manually operated.

13. A film transfer device claimed in claim 8, wherein said film housing device is mounted on a reproducing device that reproduces the film images.

14. A film transfer device claimed in claim 9, wherein said film housing device is mounted on a reproducing device that reproduces the film images.

15. An image reproducing system, comprising:
    a housing member that houses a film container in which a developed film is accommodated;
    a driving mechanism on said housing member that thrusts out the film from said film container and transfers the film to a reproducing position; and
    a reproducing apparatus which reproduces an image on the film transferred to the reproducing position,
    wherein said housing member is mounted on said reproducing apparatus.

16. An image reproducing system claimed in claim 15, wherein said driving mechanism is controlled by said reproducing apparatus.

17. An image reproducing system claimed in claim 15, wherein said reproducing apparatus reproduces a film image other than said film image housed in said housing member.

18. An image reproducing system claimed in claim 17, wherein said housing member comprises a guide member which guides a film plane to a position in which the film image is reproduced in said reproducing apparatus.

19. An image reproducing system claimed in claim 15, wherein said housing member comprises a guide member which guides a film plane to a position in which the film image is reproduced in said reproducing apparatus.

20. An image reading system, comprising:
    a housing member that houses a film container in which a developed film is accommodated;
    a driving mechanism on said housing member that thrusts out the film from said film container and transfers the film to a reading position; and
    a reading apparatus which reads an image on the film transferred to the reproducing position
    wherein said housing member is mounted on said reading apparatus.

* * * * *